United States Patent
Landsmann et al.

(10) Patent No.: US 8,528,521 B2
(45) Date of Patent: Sep. 10, 2013

(54) METHOD AND DEVICE FOR CLOSED-LOOP COMBUSTION CONTROL FOR AN INTERNAL COMBUSTION ENGINE

(75) Inventors: Gerhard Landsmann, Rödern (DE); Alessandro Catanese, Orbassano (DE)

(73) Assignee: GM Global Technology Operations LLC, Detroit, MI (US)

( * ) Notice: Subject to any disclaimer, the term of this patent is extended or adjusted under 35 U.S.C. 154(b) by 549 days.

(21) Appl. No.: 12/877,897

(22) Filed: Sep. 8, 2010

(65) Prior Publication Data

US 2011/0083642 A1    Apr. 14, 2011

(30) Foreign Application Priority Data

Sep. 9, 2009 (GB) .................................. 0915745.4

(51) Int. Cl.
*F02M 7/00* (2006.01)
*F02M 7/04* (2006.01)

(52) U.S. Cl.
USPC ............................. 123/435; 123/494; 701/111

(58) Field of Classification Search
USPC .......... 123/435, 494, 406.21, 406.22, 406.26, 123/406.29, 406.37, 406.41; 701/102, 103, 701/111
See application file for complete search history.

(56) References Cited

U.S. PATENT DOCUMENTS

| | | |
|---|---|---|
| 5,359,883 A | 11/1994 | Baldwin et al. |
| 6,508,229 B2 | 1/2003 | Miyakubo et al. |
| 7,133,761 B2 | 11/2006 | Ancimer |
| 7,201,137 B2 | 4/2007 | Kesse et al. |
| 2008/0053405 A1 | 3/2008 | Vigild et al. |
| 2009/0132145 A1* | 5/2009 | Angeby ................... 701/102 |
| 2011/0132332 A1* | 6/2011 | Caretta et al. ............ 123/486 |

FOREIGN PATENT DOCUMENTS

| | | |
|---|---|---|
| EP | 1164277 A2 | 12/2001 |
| WO | 2005001263 A1 | 1/2005 |
| WO | 2007008282 A2 | 1/2007 |

OTHER PUBLICATIONS

British Search Report dated Jan. 7, 2010 for Application No. GB0915745.4.

* cited by examiner

*Primary Examiner* — Mahmoud Gimie

(74) *Attorney, Agent, or Firm* — Ingrassia Fisher & Lorenz, P.C.

(57) ABSTRACT

A method for closed-loop combustion control within an internal combustion engine, that includes, but is not limited to individual calculation of actual Start of Combustion (SoC) information for all cylinders of said internal combustion engine using information from a combustion sensor applied to the engine, calculation of 50% Mass Fraction Burned (MFB50) and SoC information using cylinder pressure sensor information available from at least one leading cylinder of the engine, using pressure-based MFB50 information from the at least one leading cylinder to control it in closed loop, and using pressure-based SoC information from said at least one leading cylinder as a reference value for comparison with the combustion sensor based value of SoC from the same cylinder in order to calculate the desired SoC for the other cylinders of the engine which are then controlled relative to said at least one leading cylinder.

19 Claims, 2 Drawing Sheets

METHOD AND DEVICE FOR CLOSED-LOOP COMBUSTION CONTROL FOR AN INTERNAL COMBUSTION ENGINE

CROSS-REFERENCE TO RELATED APPLICATION

This application claims priority to British Patent Application No. 0915745.4, filed Sep. 9, 2009, which is incorporated herein by reference in its entirety.

TECHNICAL FIELD

The present invention relates to a method and a device for closed-loop combustion control within an internal combustion engine.

BACKGROUND

It is known to control the injection of fuel into internal combustion engines using an open-loop control circuit. In these conventional systems the injection time and the pulse width of the injection are determined from predefined values stored in the engine's electronic control unit. Although such systems exhibit acceptable performance, they are otherwise prone to defects typical of open loop control. For example, the flow characteristics of an injector in a diesel engine may change during time as a result of wear phenomena, thus the pulse width used for the injector will no longer supply the engine with the desired quantity of fuel, and in general the performance of the engine will be degraded, giving way to higher emissions, higher fuel consumption, increased noise and even the possibility of damage to the engine.

In order to improve such situation, more recent engine combustion concepts, for example diesel Premixed Charge Compression Ignition (PCCI) and gasoline Homogenous Charge Compression Ignition (HCCI), require closed-loop control of characteristic combustion parameters, such as Start-of-Combustion (SoC), 50% fuel mass fraction burned (MFB50), location of peak pressure (LPP) and other parameters, in order to stabilize combustion and reduce emission dispersion on a cylinder-individual basis. Mostly combustion phasing based on MFB50 is performed.

These parameters can be directly measured by means of combustion pressure sensors. These sensors are being developed for application in production engines in a configuration that uses one sensor per cylinder.

While this solution has the best control accuracy, one serious problem of this approach is the high cost of the pressure sensors and therefore also sensor thrifting has been considered, e.g., having only two pressure sensors per engine or even one sensor per cylinder bank and applying information derived from such pressure sensor(s) to control also the cylinder(s) without pressure sensor(s) in order to reduce total cost. This second approach results in a reduced number of sensors per engine and gives way to closed-loop control of "lead cylinders" with pressure sensors and subordinated open-loop control of non-sensed cylinders depending on "lead cylinders".

The benefit of this approach is reduced cost; the approach is still acceptable for Euro5 emission control standard, but it has the drawbacks of limited controls quality, increased emission dispersion and in general it is not acceptable for the tighter standard Euro6.

A further known approach is based on crank-speed fluctuation measured with a standard crank-speed sensor used to closed-loop control combustion phasing on a gasoline HCCI engine. Still another approach uses a torque sensor that provides a crank-angle resolved torque pattern for each cylinder. Torque is related to the in-cylinder pressure during combustion.

U.S. patent application US 2008/0053405 discloses another approach, namely a method of performing feedback control of the operation of an internal combustion engine based on a signal obtained from a vibration sensor and a crankshaft angle sensor. The vibration sensor preferably used is a knock sensor traditionally applied in spark-ignition internal combustion engines to detect auto-ignition. In the method a voltage or charge signal from said vibration sensor is acquired multiple times during a window of engine rotation. These signals, after suitable filtering and adjusting operation, are squared to obtain unfiltered energy factor values which are low pass filtered to remove high frequency components to obtain filtered energy factor values. A vector of energy factors can be computed as a function of crank angle degree over a particular window of engine rotation of interest. Based on the energy factor vector, combustion phasing can be estimated. Such method however mainly gives information on the start of combustion, because the vibration sensor substantially picks up vibrations associated with Start of Combustion (Soc) pulses for each cylinder.

At least one aim of the invention is therefore to provide for a method and a device for closed-loop combustion control within an internal combustion engine that improves the combustion phasing of the engine, while at the same time has reduced costs with respect to prior art methods. A further aim of the invention is to provide a reliable method for closed-loop combustion control which does not require a powerful hardware to be implemented. In addition, other aims, desirable features, and characteristics will become apparent from the subsequent summary and detailed description, and the appended claims, taken in conjunction with the accompanying drawings and this background.

SUMMARY

The embodiments of the invention provide for a method for closed-loop combustion control within an internal combustion engine, wherein of comprising at least the following phases: individual calculation of actual Start of Combustion (SoC) information for all cylinders of said internal combustion engine using information from a combustion sensor applied to said engine; calculation of 50% Mass Fraction Burned (MFB50) and SoC information using cylinder pressure sensor information available from at least one leading cylinder of the engine; using pressure-based MFB50 information from said at least one leading cylinder to control it in closed loop; using pressure-based SoC information from said at least one leading cylinder as a reference value for comparison with the combustion sensor based value of SoC from the same cylinder in order to calculate the desired SoC for the other cylinders of the engine which are then controlled relative to said at least one leading cylinder.

The embodiments of the invention also provides for a device for closed-loop combustion control within an internal combustion engine comprising a combustion sensor applied to said engine and at least one pressure sensor applied to one of the cylinders of the engine, The device comprises an electronic device for performing the calculations of the above described method.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

A preferred embodiment of the present invention is now described with reference to FIG. 2 in which an engine block 16, having four cylinders 10'-13' is depicted, each cylinder being provided with its respective injector 10-13. The engine block 16 has a combustion sensor applied to it. Preferably but not necessarily a vibration sensor is used, such as a standard "knock-sensor" device. Without loss of generality the term vibration sensor will be used in the following description, being intended that in alternative other combustion sensors such as an ionization sensor or a crankshaft wheel speed analysis may be used equivalently for the aims of the invention. Pressure sensors 9 and 14 are applied to only two of the cylinders and, in the exemplary configuration depicted, pressure sensor 9 is applied to cylinder 13' while pressure sensor 14 is applied to cylinder 12', the other two cylinders 10'-11' being devoid of pressure sensors. Vibration and pressure sensors are connected to electronic processing means (not represented) for performing the calculations required by the method.

Figure 1:
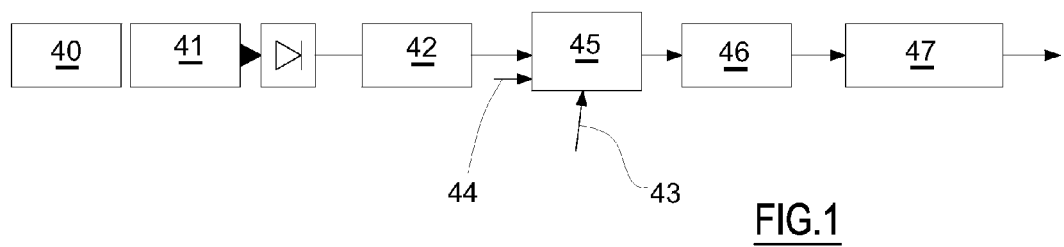
FIG. 1 is a schematic representation of the steps used for the calculation of actual Start of Combustion (SoC) using raw data signals from a applied to the engine.

The first step in the method of the invention provides for an individual calculation of actual Start of Combustion (SoC) information for all cylinders of the engine using information from the vibration sensor 15. In FIG. 2 block 8 represents the individual calculation of actual Start of Combustion (SoC) for cylinders 10'-13' using data received from vibration sensor 15. Such calculation may be performed through the following SoC signal processing steps specified in FIG. 1:

First the raw signal 40 from the sensor 15 is bandpass filtered 41 to remove frequency components above and below certain values and then it is amplified; then the signal is rectified and subjected to amplitude envelope-shaping 42. Preferably the signal is acquired as function of crankshaft-angle 43 during a window 45 of engine rotation.

The Start of Combustion (SoC) pulse is detected by signal-comparison with a threshold 44, whereby the threshold can be either calibrated or determined real-time with respect to the peak-value of the amplitude-envelope. Finally linear scaling 46 between SoC detection pulse occurrence and real-measured SoC is performed to determine actual SoC value 47. The actual SoC values for each cylinder 10'-13' calculated by block 8 are represented by numerals 22-25 in FIG. 2.

A further step of the method provides for the calculation of 50% mass Fraction Burned (MFB50) and SoC using cylinder pressure sensor information available from the pressure sensor 9 and 14, as schematically illustrated in blocks 3 and 7. The actual MFB50 for cylinders 13' (pressure sensor 9) and (pressure sensor 14) are respectively represented by numerals 18 and 20. Such pressure-based MFB50 information is used to control in closed loop the respective cylinders 13' and 12'. Moreover, actual SoC values for cylinders 13' and 12', respectively calculated from cylinder pressure sensors 9 and 14, are represented by numerals 19 and 21.

The next step of the method provides for the use of such pressure-based SoC information from cylinders 13' and 12' as a reference value for the vibration sensor based SoC values for the same cylinders. Specifically and with reference to FIG. 2, a comparison stage is provided in which the actual SoC 22 for cylinder 13', calculated from data of the vibration sensor 15, is compared with actual SoC 19 calculated from cylinder pressure sensor 9 and it is also fed to block 17 which performs the calculation of desired Soc 26 for cylinder 10'. In the same way, the actual SoC 25 for cylinder 12', calculated from data of the vibration sensor 15, is compared with actual SoC 21 calculated from cylinder pressure sensor 14 and it is fed to block 17 which performs the calculation of desired Soc 27 for cylinder 11'.

Finally the method provides for comparing the desired SoC values 26,27 of cylinders 10',11' with actual SoC information 23,24 from the same cylinders in order to determine Start of Injection (SoI) for those cylinders. Specifically, desired Soc 27 for cylinder 11' is compared (block 5) with actual Soc 24 of cylinder 11' derived from vibration sensor in order to determine Start of Injection (SoI) for said cylinder.

At the same time, desired Soc 26 for cylinder 10' is compared (block 4) with actual Soc 23 of cylinder 10' derived from vibration sensor in order to determine Start of Injection (SoI) for said cylinder. The remaining cylinders 13' and 12' are controlled in a known way by means of pressure sensors 9 and 14 respectively that derive actual MFB50 18 and 20 and feed such values in order to be compared with (blocks 2 and 6) a signal 1 that expresses a desired target MFB50.

Summarizing the method it is to be noted that MFB50 and SoC information is calculated from cylinder pressure sensor information available from one or two cylinders of the engine (in the example above the two cylinders 13' and 12') that work as a sort of "Lead Cylinders".

Concurrently MFB50 is closed-loop controlled for the Lead-Cylinders as known in the art. The pressure-based SoC values 22 and 25 of Lead Cylinders form reference values for the vibration sensor based values of SoC. The actual SoC of cylinder 13' and 12' are then compared with pressure-based SoC values 22 and 25 in order to calculate the desired SoC for cylinders 10' and 11', which are then controlled relative to the lead cylinders. Consequently it is assumed, that by this procedure, MFB50 is closed-loop controlled for all cylinders as long as heat-release characteristics are equivalent.

Figure 2:
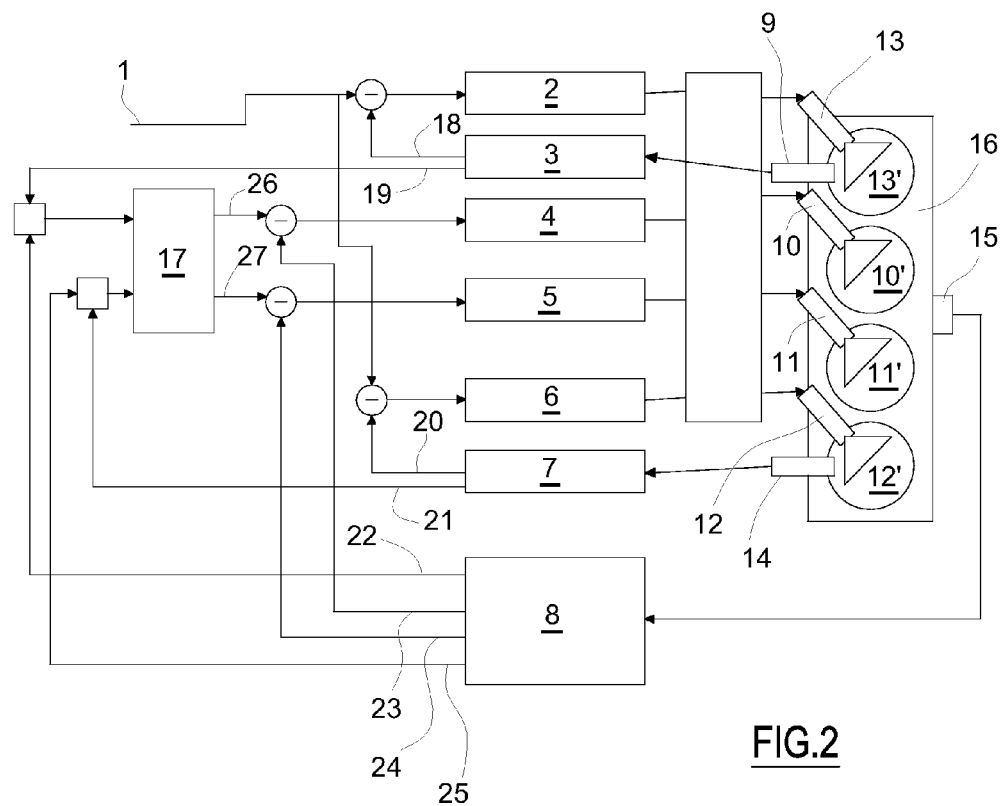
FIG. 2 is a schematic representation of an internal combustion engine employing the device for closed-loop combustion control according to one embodiment of the invention.
Figure 3:
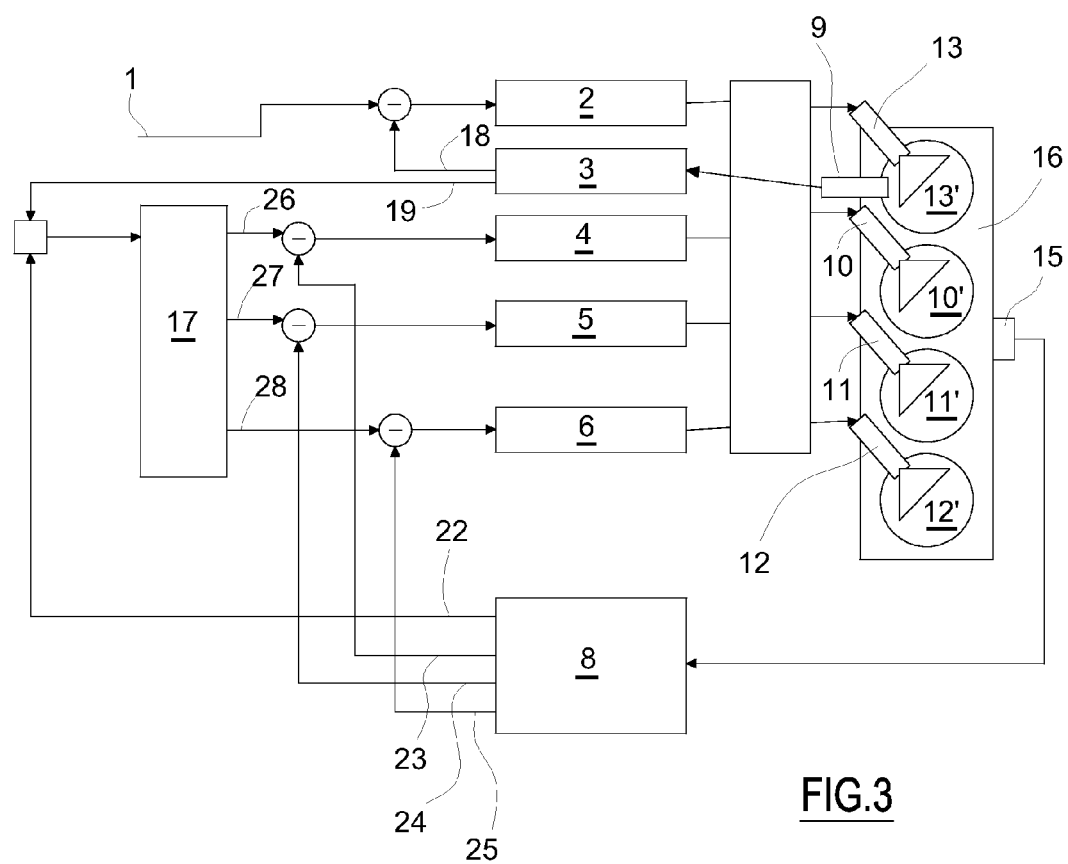
FIG. 3 is a schematic representation of a further embodiment of the invention.

A variant embodiment of the invention is depicted in FIG. 3, wherein the same elements of the embodiment of FIG. 2 are represented with the same reference numbers. In this embodiment only one pressure sensor 9, applied to cylinder 13', is provided for, the other three cylinders being devoid of pressure sensors. A vibration sensor 15 is also applied to engine block 16, preferably but not necessarily a standard "knock-sensor" device.

Operation of the embodiment of FIG. 3 is similar to the one of FIG. 2, where actual SoC information is calculated individually for all cylinders from vibration sensor information. In parallel MFB50 and SoC information is calculated additionally from cylinder pressure sensor 9, cylinder 13' working thus as "lead cylinder". Concurrently MFB50 is closed-loop controlled for the lead-cylinder 13' as known in the art. The pressure-based SoC value 22 form a reference value for the vibration sensor based values of SoC. The actual SoC 22 of cylinder 13' is then compared with pressure-based SoC value 19 in order to calculate the desired SoC values 26-28 for the other three cylinders, which are then controlled relative to the lead cylinder 13'.

The invention has a number of important advantages over the prior art. For example, it allows the use of a low-cost combustion sensor for Start-of-Combustion (SoC) metric. As a second advantage, the invention allows a precise closed-loop combustion phasing control with reduced number of pressure sensors or even with only one pressure sensor per engine. Furthermore the invention does not need specially designed vibration sensors, because standard "knock-sensor" devices can be effectively used, avoiding unnecessary costs. In general therefore the invention allows a substantial reduction of costs with respect to the prior art, without a sensible degradation in the performance of the engine. Finally, the invention has a wide range of potential applications, for example in order to comply to Euro5 (and beyond) emission control standards. The invention is also equally applicable both to diesel engines and to gasoline engines.

While the present invention has been described with respect to certain preferred embodiments and particular applications, it is understood that the description set forth herein above is to be taken by way of example and not of limitation. Those skilled in the art will recognize various modifications to the particular embodiments are within the scope of the appended claims. Therefore, it is intended that the invention not be limited to the disclosed embodiments, but that it has the full scope permitted by the language of the following claims. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for closed-loop combustion control within an internal combustion engine, comprising the steps of:
    individually calculating of an actual Start of Combustion (SoC) for all cylinders of said internal combustion engine using information from a combustion sensor applied to the internal combustion engine;
    calculating a 50% Mass Fraction Burned (MFB50) and a SoC information using cylinder pressure sensor information available from at least one leading cylinder of the internal combustion engine;
    using a pressure-based MFB50 information from said at least one leading cylinder to control in a closed loop; and
    using a pressure-based SoC information from said at least one leading cylinder as a reference value for comparison with the combustion sensor based value of SoC from the same cylinder in order to calculate the desired SoC for the other cylinders of the engine which are then controlled relative to said at least one leading cylinder.

2. The method for closed-loop combustion control as in claim 1, wherein the using of the calculating of MFB50 and Soc information using cylinder pressure sensor information available is performed in two leading cylinders of the engine.

3. The method for closed-loop combustion control as in claim 1, further comprising using the pressure-based MFB50 information from two leading cylinders to respectively control in closed loop said cylinders.

4. The method for closed-loop combustion control as in claim 1, further comprising using the pressure-based SoC information from two leading cylinders as a reference values for the combustion sensor based values of SoC.

5. The method for closed-loop combustion control as in claim 1, wherein in respectively comparing the SoC values of two leading cylinders with pressure-based SoC information from said two cylinders in order to calculate the desired SoC for the other cylinders of the engine.

6. The method for closed-loop combustion control as in claim 1, wherein the combustion sensor signal is acquired as function of crankshaft-angle during a window of engine rotation.

7. The method for closed-loop combustion control as in claim 1, wherein said combustion sensor is a vibration sensor.

8. The method for closed-loop combustion control as in claim 1, wherein the individual calculation of actual Start of Combustion (SoC) information for all cylinders of said internal combustion engine using information from a combustion sensor applied to said engine comprises the steps of:
    bandpass filtering of raw signal from said combustion sensor;
    rectifying and amplitude envelope-shaping of the signal;
    detecting of Start of Combustion (SoC) pulse by signal-comparison with a threshold, whereby the threshold can be either calibrated or determined real-time with respect to the peak-value of an amplitude-envelope; and
    linear scaling between SoC detection pulse occurrence and real-measured SoC.

9. A device for closed-loop combustion control within an internal combustion engine having a plurality of cylinders, comprising:
    a combustion sensor applied to the internal combustion engine;
    a pressure sensor applied to at least one of the cylinders of the engine; and
    an electronic device adapted to:
        individually calculate an actual Start of Combustion (SoC) for all cylinders of said internal combustion engine using information from a combustion sensor applied to the internal combustion engine;
        calculate a 50% Mass Fraction Burned (MFB50) and a SoC information using cylinder pressure sensor information available from at least one leading cylinder of the internal combustion engine;
        use a pressure-based MFB50 information from said at least one leading cylinder to control in a closed loop; and
        use a pressure-based SoC information from said at least one leading cylinder as a reference value for comparison with the combustion sensor based value of SoC from the same cylinder in order to calculate the desired SoC for the other cylinders of the engine which are then controlled relative to said at least one leading cylinder.

10. The device for closed-loop combustion control as in claim 9, further comprising at least two pressure sensors, each of the at least two pressure sensors applied to a cylinder of the internal combustion engine.

11. The device for closed-loop combustion control as in claim 9, wherein said combustion sensor is a vibration sensor.

12. The device for closed-loop combustion control as in claim 11, wherein said vibration sensor is a knock sensor.

13. The device for closed-loop combustion control as in claim 9, wherein the use of the MFB50 and Soc information using cylinder pressure sensor information available is performed in two leading cylinders of the engine.

14. The device for closed-loop combustion control as in claim 9, said electronic device further adapted to use the pressure-based MFB50 information from two leading cylinders to respectively control in closed loop said cylinders.

15. The device for closed-loop combustion control as in claim 9, said electronic device further adapted to use the pressure-based SoC information from two leading cylinders as a reference values for the combustion sensor based values of SoC.

16. The device for closed-loop combustion control as in claim 9, wherein in respectively comparing the SoC values of two leading cylinders with pressure-based SoC information from said two cylinders in order to calculate the desired SoC for the other cylinders of the internal combustion engine.

17. The device for closed-loop combustion control as in claim 9, wherein the combustion sensor signal is acquired as function of crankshaft-angle during a window of engine rotation.

18. The device for closed-loop combustion control as in claim 9, wherein said combustion sensor is a vibration sensor.

19. The device for closed-loop combustion control as in claim 9, wherein said electronic device is adapted to perform the individual calculation of actual Start of Combustion (SoC) information for all cylinders of said internal combustion engine using information from a combustion sensor applied to said internal combustion engine by:

bandpass filtering of raw signal from said combustion sensor;

rectifying and amplitude envelope-shaping of the signal;

detecting of Start of Combustion (SoC) pulse by signal-comparison with a threshold, whereby the threshold can be either calibrated or determined real-time with respect to the peak-value of an amplitude-envelope; and linear scaling between SoC detection pulse occurrence and real-measured SoC.

* * * * *